United States Patent [19]

Musselmann et al.

[11] Patent Number: 4,641,790
[45] Date of Patent: Feb. 10, 1987

[54] SYSTEM FOR WASTEPAPER PROCESSING USING A WASH FILTER

[75] Inventors: Walter Musselmann, Heidenheim; Helmut Konecsny, Giengen, both of Fed. Rep. of Germany

[73] Assignee: J. M. Voith GmbH, Fed. Rep. of Germany

[21] Appl. No.: 680,740

[22] Filed: Dec. 12, 1984

[30] Foreign Application Priority Data

Dec. 16, 1983 [DE] Fed. Rep. of Germany ....... 3345548

[51] Int. Cl.⁴ .................... D21B 1/32; D21C 5/02
[52] U.S. Cl. .................... 241/46.17; 162/4; 162/261; 162/55; 209/211; 68/181 R
[58] Field of Search .................... 209/211; 241/46.17, 241/46.11; 162/261, 4, 5, 55; 68/181 R

[56] References Cited

U.S. PATENT DOCUMENTS

| | | | |
|---|---|---|---|
| 3,474,972 | 10/1969 | Kobayashi | 241/61 |
| 3,859,206 | 1/1975 | Baggaley | 209/211 |
| 3,942,728 | 3/1976 | Christ et al. | 241/46.17 |
| 3,989,197 | 11/1976 | Neitzel | 241/46.17 |
| 4,017,033 | 4/1977 | Trä | 162/4 |
| 4,135,671 | 1/1979 | Kuhrs | 241/46.11 |
| 4,167,249 | 9/1979 | Kohrs | 241/46.17 |
| 4,252,640 | 2/1981 | Musselmann | 209/211 |
| 4,397,713 | 8/1983 | Lambrecht | 162/261 |
| 4,447,320 | 5/1984 | Lamort | 209/273 |

FOREIGN PATENT DOCUMENTS 638380 12/1978 U.S.S.R. .................... 209/211

Primary Examiner—S. Leon Bashore
Assistant Examiner—K. M. Hastings
Attorney, Agent, or Firm—Jeffers, Irish & Hoffman

[57] ABSTRACT

A system for wastepaper processing which uses a newly developed wash filter of a simple design. The wash filter includes a generally round agitating space and an accepted stock space. The accepted stock space is separated from the agitating space by an essentially flat screen. An agitating wheel is positioned within the agitating space and in front of the flat screen. An entrance space for receipt of fibrous suspension and wash water is also included in the wash filter. The entrance space has a smaller diameter than the diameter of the agitating space. Flow of the suspension from either a primary pulper or a secondary pulper is received in the entrance space of the wash filter. A tailing removal line is in communication with and extends from the agitating space of the wash filter.

2 Claims, 3 Drawing Figures

SYSTEM FOR WASTEPAPER PROCESSING USING A WASH FILTER

BACKGROUND OF THE INVENTION

The invention relates to a system for wastepaper processing, and more specifically, to a system for wastepaper processing with a primary pulper.

German Patent Disclosure No. 25,141,62 shows a system for wastepaper processing. In this system, the heavy dirt laden fraction which is drawn from the secondary pulper is routed to a hydrocyclone whereafter the accepted stock separated by the hydrocyclone is then routed back to the primary pulper.

In another system for wastepaper processing shown in German Document No. 2,759,113, both the fraction laden with light pulp and the fraction laden with heavy dirt pass through the hydrocyclone and are discharged from the secondary pulper. These fractions are subjected to several purification stages. In this system the accepted stock gained in the interim is routed to an accepted stock accumulator while finally a residual portion heavily laden with dirt is recirculated to the primary pulper. As can be appreciated, it is very expensive to design a system such as that described above for performing the necessary processing steps until the accepted stock has been reasonably rid of dirt and a residual portion of fiber suspension, which is relatively heavily laden with dirt, obtained and returned to the pulper.

SUMMARY OF THE INVENTION

It is an object of the invention to provide a system for wastepaper processing that is of a simplified design as compared to earlier systems, and consequently, is less expensive to construct.

In one form thereof, the invention is a system for wastepaper processing utilizing a primary pulper. The system comprises a wash filter which includes a generally round agitating space. The wash filter further includes an accepted stock space which is separated from the agitating space by an essentially flat screen. An agitating wheel is positioned within the agitating space and in front of the screen. The wash filter further includes an entrance space for receipt of fiber suspension and wash water. The entrance space is of a diameter smaller than the diameter of the agitating space. The entrance space is connected to the primary pulper through a hydrocyclone. A tailing removal line originates from said agitating space of said wash filter.

In another form thereof, the invention is a system for wastepaper processing utilizing a primary pulper and secondary pulper. The system comprises a wash filter having a generally round agitating space and an accepted stock space. The accepted stock space is separated from the agitating space by an essentially flat screen. An agitating wheel is positioned within the agitating space and in front of flat screen. The wash filter further includes an entrance space for receipt of fiber suspension and wash water. The entrance space has a diameter that is smaller than the diameter of the agitating space. The entrance space is connected to the light dirt fraction drain line of the secondary pulper which is positioned downstream of a primary pulper. The secondary pulper includes and accepts space which is separated from an agitating space by a screen. The drain line for the fraction laden with light dirt originates at one side of the secondary pulper. A line for the removal of fiber suspension laden with heavy dirt originates from the circumference of the secondary pulper. The wash filter further includes a tailing removal line which originates from the agitating face of the wash filter.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings.

DETAILED DESCRIPTION OF SPECIFIC EMBODIMENTS

Figure 1:
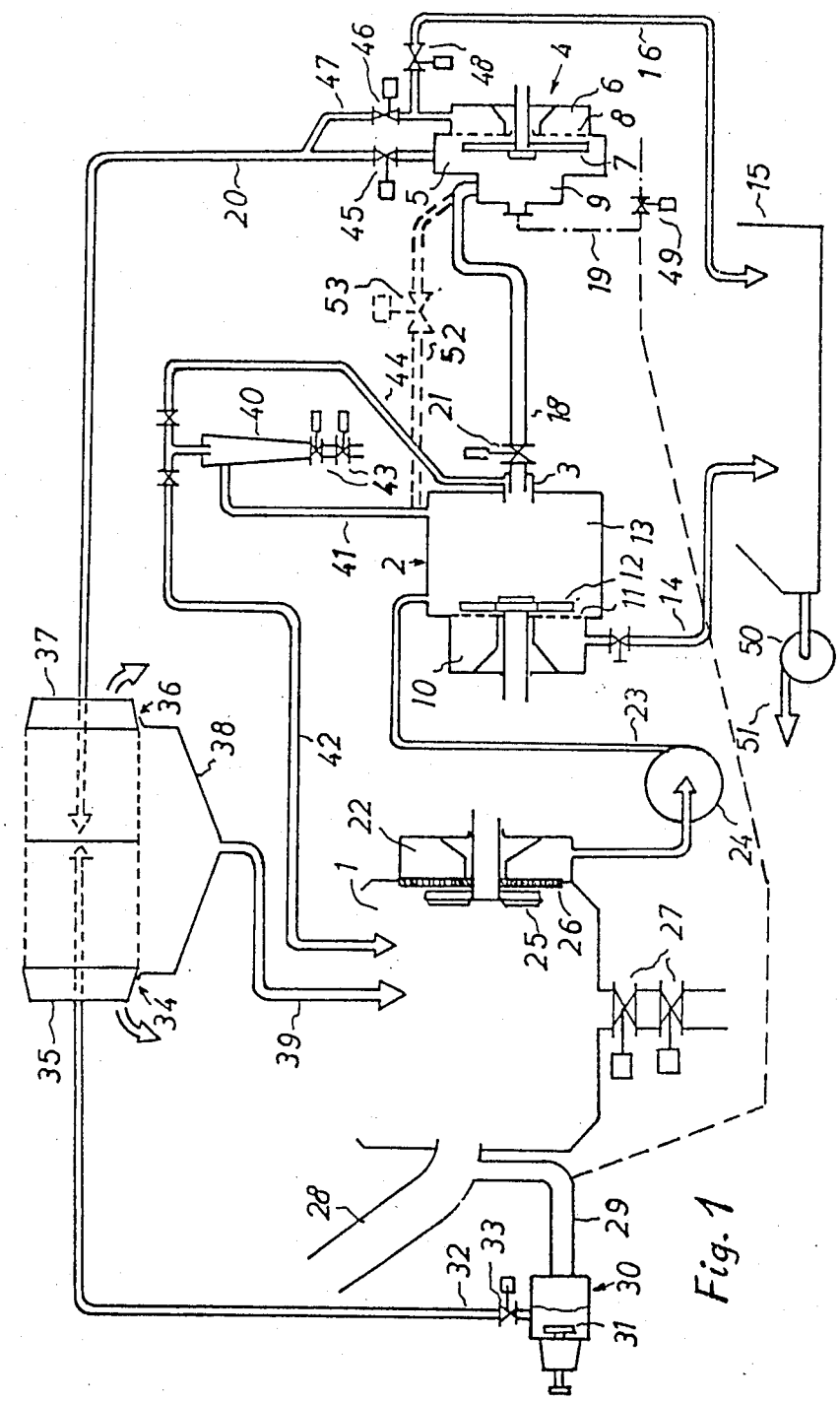
FIG. 1 is a diagrammatic view of a specific embodiment of the system of the invention.

Referring to FIG. 1, a primary pulper 1 of the system has positioned downstream therefrom a secondary pulper 2. Secondary pulper 2 includes a central outlet 3 from which a fraction of the suspension which is laden with light dirt can be drawn. This fraction of the suspension laden with light dirt is routed to a wash filter 4, wherein the wash filter itself is the subject of co-pending U.S. patent application Ser. No. 680,741, filed on the same date as the present application. Wash filter 4 includes a central agitation space 5 which is separated from an accepted stock space by a screen 8. A paddle wheel 7 is positioned in front of screen 8 and within agitation space 5. Paddle wheel 7 is positioned coaxially with respect to the agitating space. The agitating space 5 is preceded by a coaxially arranged entrance space 9. A stock line 18, which delivers a fraction of the suspension laden with light dirt, is fluidly connected to entrance space 9. Line 18 is connected to entrance space 9 so that it enters space 9 tangentially. A wash water line 19 is also in fluid communication with entrance space 9. Wash water line 19 enters entrance space 9 at the end of the space as illustrated in FIG. 1. It should be appreciated that the housing of secondary pulper 2 has an essentially rotationally symmetric or circular shape. Secondary pulper 2 includes an accepts space 10 which is separated from an agitation space 13 by a screen 11. An agitating wheel is mounted within agitating space 13 and in front of screen 11. Accepted stock separated by screen 11 proceeds through a line 14 to an accepted stock accumulator 15.

The accepts from the accepts space 6 of wash filter 4 are also passed to accepted stock accumulator 15 through a line 16. Further, a stock line 20 extends from agitation space 5 of wash filter 4. The agitating wheel 12 generates in the agitation space 13 of the secondary pulper 2 a turbulent flow which makes it possible to draw from its periphery a fraction laden with heavy dirt and from its central area a fraction laden with light dirt. As previously mentioned, the fraction laden with light dirt is drawn through light stock drawing outlet 3. An automatically operable valve or slide 21, which is contained in line 18, may be periodically open for passing the respective fraction which is laden with light dirt to the wash filter 4.

Primary pulper 1 includes an accepts space 22 into which an accepts fraction is drawn after being sifted by means of a screen 26 with the aid of a rotor 25. Heavy dirt is discharged from primary pulper 1 as usual through heavy dirt lock 27. A deragging line 28 is connected to primary pulper 1 and runs to a deragger. A line 29 is connected to deragging line 28 for carrying fiber suspension to an extraction apparatus 30. A beater wheel 31 is provided in an extraction space of extraction apparatus 30 and serves to further dissolve the paper shreds. A valve 33 is incorporated in a discharge line 32 which is connected to the extraction apparatus 30. Valve 33 may be kept closed for a period of time so as to affect the dissolution of the paper shreds. Line 32 runs from extraction apparatus 30 to drum sorter 34. Drum sorter 34 rotates about a generally horizontal axis wherein unsortable dirt is removed at the end side through an opening 35. Sorter accepts which are not so heavily laden with dirt proceed through the perforation in the drum sorter 34 and to an accumulator 38. The sortable accepts then proceed to the primary pulper 1 through a line 39.

Heavy dirt laden suspension drawn from secondary pulper 2 by the hydrocyclone 40 through line 41 may also be routed again to primary pulper 1 through line 42. It is also possible to return the accepts fraction from the hydrocyclone 40 through a line 44 so as to connect with light fraction drawing outlet 3 of the secondary pulper 2 and its agitating space 13.

An automatically operatable valve 45 is incorporated in line 20 which exits agitating space 5 of wash filter 4. The accepts line originating from accepts space 6 of wash filter 4 includes a branch 47 having an automatically operable valve 46 contained therein. Accepts drain line 16 also has an automatically operable valve 48 contained there. An automatically operable valve 49 is also provided in water wash line 19.

Once valve 21 has been opened, valves 45 and 46 may be kept closed so as to first route the accepted stock separated in the wash filter from the accepts space 6 to the accumulator 15 (Phase I). Only after a larger amount of dirt has accumulated in the agitating space of the wash filter will valve 48 be closed and valve 46 (in line 47) and valve 49 (in wash water line 19) be opened. It should be mentioned that valve 49 may also be opened somewhat sooner thus continuing for some time to pass usable fiber suspension, which is not so heavily diluted yet, to the accepts accumulator 15 (Phase IIa). The opening of valve 49 and wash water line 19 results in a further agitation and aeration of the fiber suspension contained in the agitating space 5 thereby enabling a further sorting of the fiber suspension by screen 8 (Phase II and/or Phase IIb). It should also be mentioned that wash water is provided through line 100 (dashed line) to the line 29 when valve 49 is open. The accepts obtained during that time proceed through a line 20 into the drum sorter 36 which rotates about a generally horizontal axis. Drum sorter 36 further includes a perforated cylinder. In a fashion similar to drum sorter 34, the unsortable portion is separated through end opening 37 whereas the sortable accepts, which are relatively lightly laden with dirt, proceed through the perforation and into the accumulator 38. From the accumulator the sortable accepts proceed into the first pulper 1. The two drum components 34 and 36 of the specific embodiment are combined into a unit and are separated by a partition. This suspension is fed through lines 32 and 20 to drum components 34 and 36, respectively, as can be seen by FIG. 1.

As soon as wash water is fed to the wash filter 4 through line 19 (this is, of course, with valve 49 being open), valve 21 and line 18 should suitably be closed. Once line 47 has been open for some time by means of opening valve 46, the valve 46 is closed again and line 45 is opened. With valve 49 open, the wash water washes with the aid of the agitating wheel 7 the residual portion, which specifically consists of dirt portions and contains only few fibers, out of the agitating space 5 through line 20 (Phase III). A fraction still containing usable fiber portions is then reclaimed by drum component 36 and routed into the primary pulper 1 for further processing.

A pump 50 moves the accepted material through line 51 out of the accumulator 15.

In a situation of a lower heavy dirt content, the heavy dirt removal line of the secondary pulper 2 may be connected by a line 52 (illustrated as a dash line) to the wash filter 4, thus preventing additional wear on hydrocyclone 40. As an additional removal Phase Ib, shutoff organ 53 in line 52 may be opened prior to initiation of Phases II and/or IIa and IIb.

It is readily possible to replace drum component 36 by a decker and dump the material of Phase III, and possibly Phase IIb, which hardly contain any usable fiber portion after deckering and use decker water as diluting water for the pulper.

As already mentioned, wash filter 4 comprises an agitating space 5 and an entering space 9 proceeding it. The diameter of the entrance space 9 is considerably smaller than that of the agitating space 5. In fact, the volume of entrance space 9 is only about 30 percent to about 60 percent of the volume of agitating space 5. Agitating space is designed as a compact disk-shaped cylinder. Agitating space has a width b of about 30 centimeters (cm). Its ratio of its width to its diameter D (b/D) ranges between about 0.15 and about 0.35. A ratio (b/D) between about 0.2 and about 0.3 has been found to be most suitable for a favorable wash effect. This results in a large screen area 8 and relative small volume of the agitating space 5. The volume is about only 20 to 50 percent of the volume of agitating space 13 of the secondary pulper 2. The arrangement of the serial entrance space and the flat, disk-shaped agitating space results in a good agitation of the wash water, and due to the large screen area it is possible to obtain a high throughput. Prior wash filters would be entirely insufficient for that purpose due to the treated fiber suspension which is relatively heavily laden with dirt.

The perforation diameter of the screen in the wash filter 4 is suitably selected between 2 and 3 millimeters while the perforation diameter in the secondary pulper ranges between 3 and 5 millimeters. The screen perforation diameter in the drum component 34 is suitably between 18 and 22 millimeters, and in the drum component 36 screen perforation diameter is between 3 and 5 millimeters. The reason for the much finer perforations of the drum component 36 is that the fiber suspension treated herein contains much finer dirt particles. If the drum components were separate, each could have a different speed of rotation and have its diameter adapted to its respective needs.

In addition, defiberizing strips may be provided on screen 8 on the side facing the agitating wheel.

Figure 3:
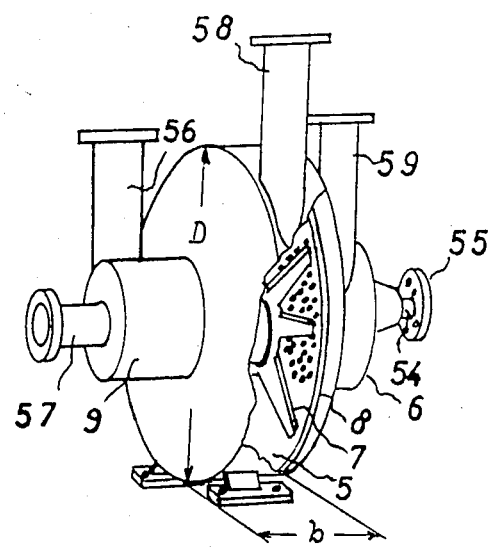
FIG. 3 is a perspective view of the wash filter having a portion of the housing thereof cut away.

Referring to FIG. 3, it can be seen that entrance socket 56 is positioned tangentially relative to entrance space 9, discharge socket 58 is positioned tangentially relative to agitating space 5, and discharge socket 59 is positioned tangentially relative to accepts space 6. The wash water connection 57 is provided in the center of entrance space 9. Further, the rotor is driven the by the shaft 57 via a coupling flange 55 as illustrated in FIG. 3.

A major advantage of the invention is that tailing occurs after the wash filter (Phase III and possibly Phase IIb) has only a low fiber content. The duration of phases II and III are very short relative to Phase I (the ratio is about 1:10 to 1:15) so that the material is very extensively defiberized in the agitating space 5 of the wash filter by the rotor and the screen. Therefore, the tailing of the phases as described above can simply be dehydrated and dumped.

Moreover, the invention offers a great advantage in that accepts with a consistency of about 4 percent are obtained downstream of the secondary pulper and the wash filter making deckering unnecessary. Further, the necessary investment is rather low since the drum components having their horizontal axis of rotation and due to their practically continuous operation may be designed to be relatively small. The separating effect is high since using both the diluting water of the hydrocyclone 40 and that of the wash filter 4 for adjusting the consistency of the primary pulper makes for an operation at high dilution. The same applies to the drum components 34 and 36.

Another advantage of the invention is that vibration sorters which are susceptible to malfunction can be entirely avoided.

Figure 2:
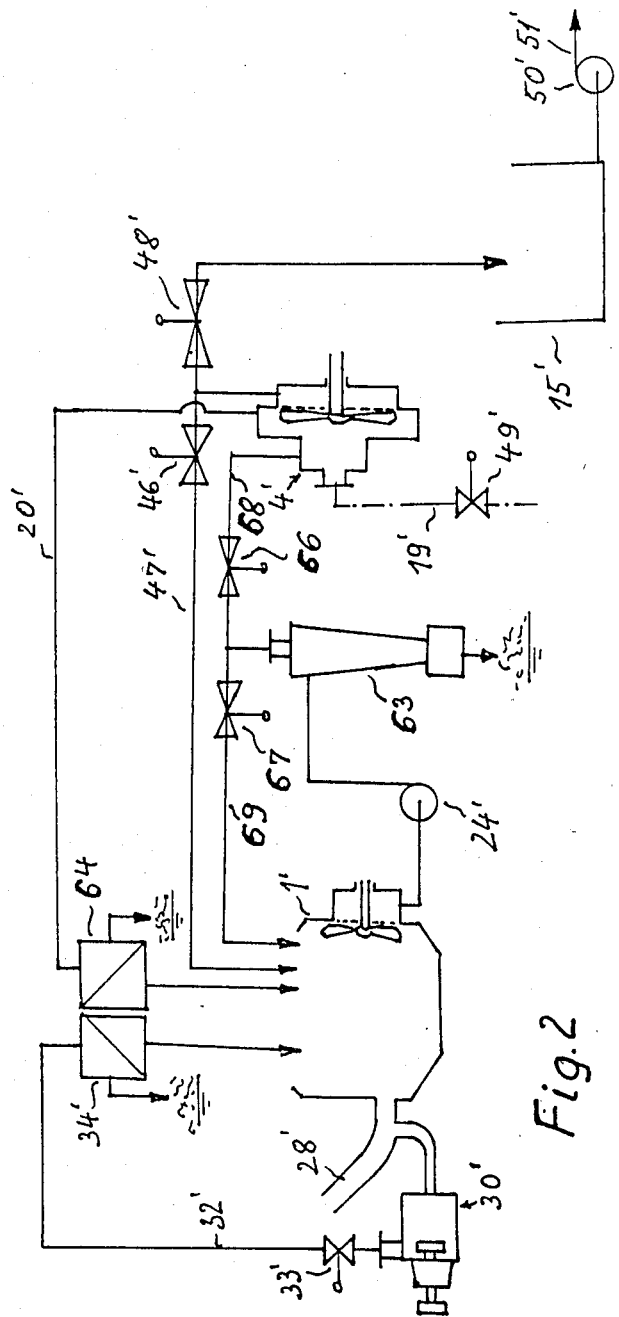
FIG. 2 is a diagrammatic view of another specific embodiment of the system of the invention.

Referring to FIG. 2, there is illustrated another specific embodiment of the invention which is designed for lower daily production than that specific embodiment illustrated in FIG. 1. The specific embodiment illustrated in FIG. 2 is designed for a maximum production of 150 tons per day. Elements illustrated in FIG. 2 which correspond to those elements in FIG. 1 are designated by the same reference numeral, but the reference numeral in FIG. 2 is primed.

It should be pointed out that the secondary pulper 2 of the system of FIG. 1 may be omitted. This task in the specific embodiment of FIG. 2 has been assumed by the wash filter 4'. The system illustrated in FIG. 2 also shows that the accepted material line 47' does not run through a separate sorter, but instead runs directly back to the primary pulper 1'. This same type of design in regard to accepted material line 47' would also be possible in the specific embodiment illustrated in FIG. 1. Valve 48' is first opened during Phase I in order to pass the accepts to the accumulator 15'. Upon start of the washing operation, with valve 49' open, the valve 48' is closed shortly thereafter and valve 46' is open. The tailing that is removed from the wash rotor 4' during Phase III through line 20' is passed to decker 64. The filtrate is passed to primary pulper 1' as diluting water.

The system illustrated in FIG. 2 incorporates a hydrocyclone 63, known as a high-consistency stock purifier for heavy particle separation, between primary pulper 1' and wash filter 4'. A line 68 having a valve 66 therein runs from the hydrocyclone 63 to the entrance of wash filter 4'. A line 69 with a valve 67 therein runs from hydrocyclone 63 to the primary pulper 1'. Valve 66 is predominantly open and is closed only when the washing operation commences after valve 49' in line 19' is open. During that time, valve 67 is then open and the suspension circulates between the primary pulper 1' and the hydrocyclone 63. Heavy contaminants, specifically particles, are removed from the processing during that time.

The system can be further simplified by omitting the transfer apparatus 30' connected to the deragging line 28' of the primary pulper 1', and instead, passing the lightly contaminated material and removed there through the dashed line in FIG. 1 as well as directly to the wash filter 4'. This alternative may be chosen with a system according to FIG. 1 when a changeover to small or daily production is intended. In this case, wash filter 4 is hooked twice in the side flow, and at that, once in the side flow originating form the secondary pulper to, and for another, in the side flow originating from the primary pulper 1. In the case of FIG. 2, the wash filter 4' connects to the primary pulper 1' practically in the main flow through the hydrocyclone 63, for daily production of more than 400 tons of wastepaper, the system components 24 through 4 in FIG. 1 could be repeatedly paralleled as required and the line suitably combined after passage through the wash filters 4.

While there have been described above the principles of this invention in connection with specific apparatus, it is to be clearly understood that this description is made only by way of example and not as a limitation to the scope of the invention.

What is claimed is:

1. A system for wastepaper processing with a primary pulper containing fiber suspension comprising:
   a wash filter, said wash filter including a generally round agitating space and an accepted stock space, said accepted stock space being separated from said agitating space by an essentially flat screen, an agitating wheel positioned within said agitating space upstream of said flat screen, said wash filter further including a generally round entrance space;
   a plurality of connector lines, one of said connector lines being tangentially connected to the entrance space, said one connector line placing said primary pulper in communication with the entrance space whereby fiber suspension is tangentially received into the entrance space, another of said connector lines having a diameter and being axially connected to the center of an end side of said entrance space, the diameter of the end side being greater than the diameter of said other connector, said other connector placing the entrance space in communication with a source of wash water whereby the wash water is axially received into the entrance space;
   the diameter of said entrance space is between about 40 percent and about 70 percent smaller than the diameter of said agitating space, and the ratio of the width to the diameter of the agitating space being between about 0.15 and about 0.35; and
   said entrance space being connected through a hydrocyclone to the primary pulper, and a tailing removal line communicating with and extending from said agitating space of said wash filter.

2. The system according to claim 1 wherein said agitating wheel of the wash filter is mounted coaxially with respect to the axis of said agitating space and the axis of said entrance space.

* * * * *